May 24, 1927.
D. R. MURPHY
1,630,133
PISTON VALVE
Filed Nov. 5, 1926
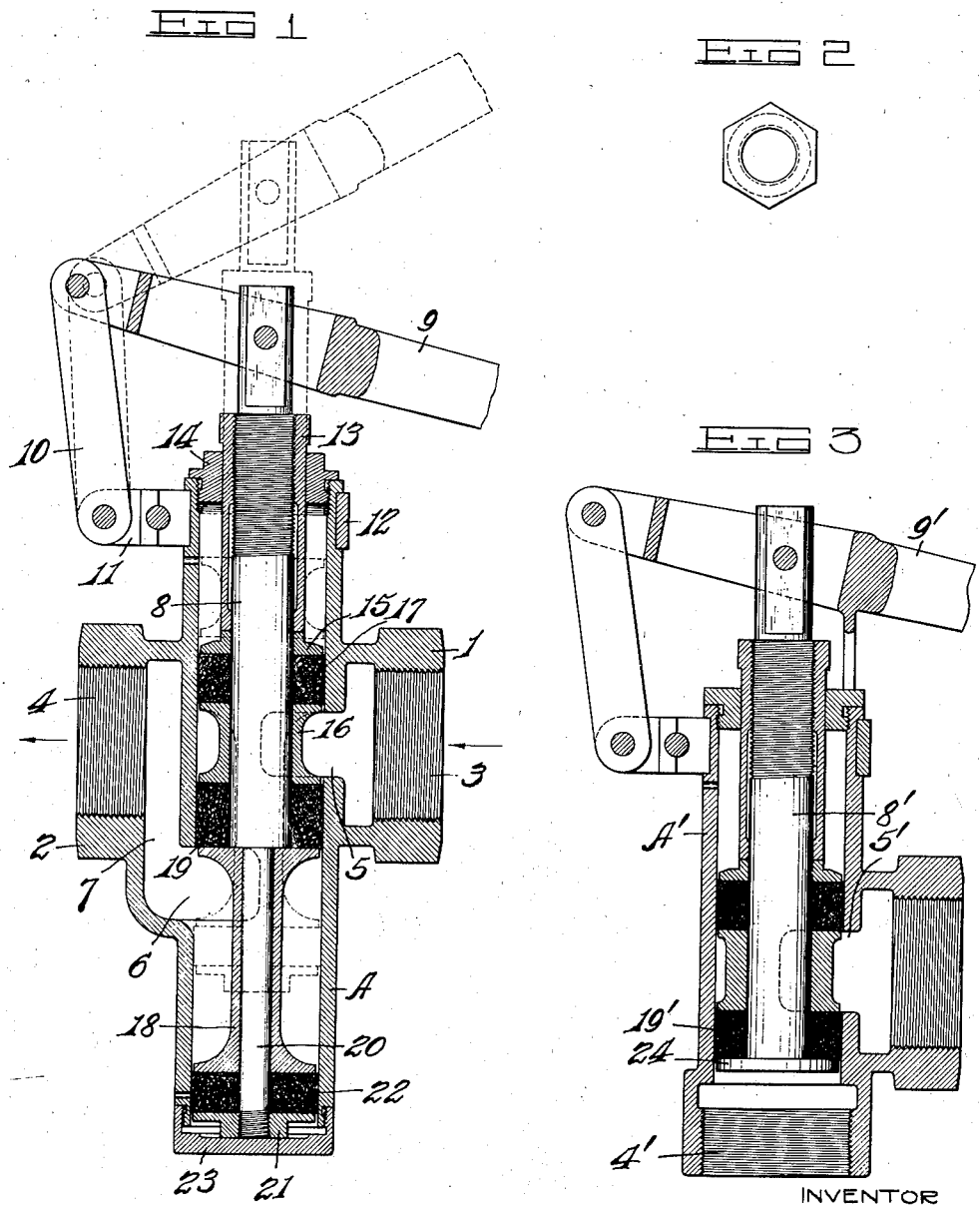
INVENTOR
D. R. Murphy
BY
N. E. Dunlap
ATTORNEY Patented May 24, 1927.

1,630,133

UNITED STATES PATENT OFFICE.

DANIEL R. MURPHY, OF NEWARK, OHIO.

PISTON VALVE.

Application filed November 5, 1926. Serial No. 146,368.

This invention relates broadly to valves for high pressure oil, gas, air and water lines, and it has for its primary object to provide a valve of reciprocating manually operated type applicable to high pressure lines, which requires relatively slight effort to effect either opening or closing thereof.

A further object is to provide a balanced piston valve which is particularly adapted for use on high pressure water lines, as locomotive washout lines, and which is practically devoid of parts subject to wear.

With these and other important objects in view, the invention resides in the features of construction, arrangement of parts and combinations of elements which will hereinafter be fully described, reference being had to the accompanying drawings, in which—

Figure 1 is a central longitudinal section of the invention in its preferred form;

Figure 2 is an inner face view of the piston assembly nut; and—

Figure 3 is a central longitudinal section of a modified form of the invention.

Referring to said drawings, A designates generally a cylindrical casing which has formed thereon at opposite sides and intermediate the ends thereof tubular threaded coupling arms 1 and 2 defining inlet and outlet passages 3 and 4. The inlet passage 3 is adapted, in the open position of the valve, to have communication with the interior of the casing through a port 5 provided in the latter in alinement with the axis of said passage, while the outlet passage 4 is in constant communication with said casing through a port 6 provided in the latter at a spaced distance from said port 5 measured lengthwise of the casing, a passage 7 located exteriorly of said casing and at a right angle to said passage 4 providing an avenue of communication between said passage 4 and said port 6.

Longitudinally movable within the casing A is a piston valve which comprises a cylindrical rod 8 disposed axially of said casing and having an end thereof projecting from an end of the latter, as shown. Pivoted intermediate its ends to said projecting end of the rod 8 is a hand lever 9 whereby said rod may be shifted, as will hereinafter be explained, one end of said lever having connection through a pivoted link 10 with a bracket 11 which is rigidly carried by the adjacent end portion of the casing A, as by means of a clamp 12.

The rod 8 has adjustably mounted thereon a sleeve 13 which constitutes a bushing that is closely fitted in and slidable therewith through a cap-like closure 14 which is removably mounted in the adjacent end of the casing. The inner end of said sleeve forms an abutment upon which seats a disk 15 which loosely embraces said rod 8. Interposed between said disk and the adjacent end of an annularly-channeled short rod-embracing spool 16 is a suitable packing 17; and interposed between the opposite end of said spool 16 and an end of a second spool 18 is a packing 19. Said second spool is loosely mounted on an axially alined stem 20 of reduced diameter which is formed on the inner end of, or integral with, said rod 8. Said spool 18, which is annularly channeled, abuts the annular shoulder which is formed on the rod 8 at the junction thereof with said stem 20, as shown in Fig. 1.

The disk 15, the spools 16 and 18 and the packings 17 and 19 are secured in their places by a nut 21 screwed upon the end of the stem 20, a packing 22 being introduced between said nut and the spool 18.

A cap 23 removably mounted upon the adjacent end of the casing A is abutted by the valve stem 20 when the parts occupy the closing position shown in Fig. 1. In said closing position, the packing 19 occupies a position between the ports 5 and 6 provided in said casing, as hereinbefore described, thus closing communication between said ports. Said ports are spaced apart a distance substantially corresponding to the thickness of the packing required, as shown.

To open communication between said ports 5 and 6, the lever 9 is moved to the opposite limit of its movement for shifting the rod 8 outward relative to the cylinder casing, thereby to position the spool 18 with its annular channel in register at one end with the port 5 and at its opposite end with the port 6, as shown in dotted lines in Fig. 1. A reverse movement of the lever effects closing of the valve.

In the modified structure shown in Fig. 3, the valve is of angle form instead of the cross valve form shown in Fig. 1. In this structure, the casing A' is made of relatively short length and the outlet passage 4' is located at the end thereof opposite that through which the rod 8' is movable. Moreover, the stem extension is omitted and carries a flange 24 upon its inner end for retaining in place the packing 19'. With this construction, the valve is opened by shifting of the operating lever 9' for moving the rod 8' and the thereby-carried parts from the closed position shown in Fig. 3 to a position in which the packing 19' is disposed at the opposite side of the port 5' of the casing.

Ready access to the piston valve for replacing worn packings may be had at all times, the packing-retaining parts being readily slidable from the stem 20 and the rod 8 upon removal of the cap 23 and the piston assembly nut 21; or, upon removal of the cap 14 and the sleeve 13, access may be had to the packings 17 and 19 from the opposite end.

It will be noted that, since the pressure on opposite ends of the piston is at all times substantially equal, shifting thereof may be effected with the application of relatively slight force. Moreover, it will be seen that there are no threaded parts which must be relatively moved in effecting operation thereof. Therefore, the most common point of valve corrosion and consequent sticking is eliminated. Additionally, there are no valve seats nor disks which can become worn or be affected by dirt, grit or scale, or require regrinding.

What is claimed is—

1. A valve of the reciprocating piston type, comprising a cylindrical casing having inlet and outlet ports therein, said ports being spaced apart lengthwise of said casing, a rod shiftable longitudinally through an end of said casing, an annularly channeled member carried by said rod, packings at opposite ends of said member, a sleeve threaded upon said rod and movable therewith through said end of the casing, said sleeve being adjustable for compressing said packings, said channeled member in the closed position of the valve being in register with the inlet port with one of said packings separating said ports, and being movable with said rod to an opposite position in which communication between said ports is opened, and means for shifting said rod.

2. A valve of the reciprocating piston type, comprising a cylindrical casing having inlet and outlet ports therein, said ports being spaced apart lengthwise of said casing, a rod shiftable longitudinally through an end of said casing, an annularly channeled member carried by said rod, packings at opposite ends of said member, said member adapted in valve-closing position to register with the inlet port with one of said packings separating said ports, an annularly channeled member carried by said rod at the opposite side of the last mentioned packing and when shifted with said rod to an opposite position to provide communication between said ports, and means for effecting shifting movement of said rod.

3. A valve of the reciprocating piston type, comprising a casing having inlet and outlet ports, a rod movable through an end of said casing, separated packings embracing said rod and engaged with the walls of said casing, annularly channeled means maintaining said packings in spaced relation, and a sleeve adjustable on said rod for adjusting said packings and said spacing means, said sleeve being movable through an end of the casing with said rod.

4. A valve of the reciprocating piston type, comprising a casing having inlet and outlet ports, a rod movable through an end of said casing, separated packings embracing said rod and engaged with the walls of said casing, one of said packings serving in one position thereof to close communication between said ports and in another position to permit communication between said ports, annularly channeled members maintaining said packings in spaced relation, and a sleeve carried by said rod and adapted for adjustment relatively to position said packings and said members, and a lever associated with said rod whereby shifting of the latter may be effected.

In testimony whereof, I affix my signature.

DANIEL R. MURPHY.